(12) United States Patent
Gonze et al.

(10) Patent No.: US 8,973,349 B2
(45) Date of Patent: Mar. 10, 2015

(54) ELECTRONICALLY HEATED HYDROCARBON (HC) ADSORBER

(75) Inventors: Eugene V. Gonze, Pinckney, MI (US); Michael J. Paratore, Jr., Howell, MI (US); Christopher J. Kalebjian, Columbus, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 947 days.

(21) Appl. No.: 13/153,711

(22) Filed: Jun. 6, 2011

(65) Prior Publication Data
US 2012/0304627 A1 Dec. 6, 2012

(51) Int. Cl.
*F01N 3/00* (2006.01)
*F01N 3/10* (2006.01)
*F01N 3/08* (2006.01)
*F01N 3/20* (2006.01)

(52) U.S. Cl.
CPC .............. *F01N 3/0814* (2013.01); *F01N 3/103* (2013.01); *F01N 3/106* (2013.01); *F01N 3/2013* (2013.01); *F01N 3/206* (2013.01); *F01N 3/2066* (2013.01); *F01N 2570/12* (2013.01); *F01N 2610/02* (2013.01); *F01N 2610/03* (2013.01); *Y02T 10/26* (2013.01); *Y02T 10/24* (2013.01)
USPC .............................. 60/286; 60/303

(58) Field of Classification Search
CPC ... F01N 3/10814; F01N 3/103; F01N 3/2026; F01N 3/2033
USPC .................................................... 60/303, 286
See application file for complete search history.

(56) References Cited

U.S. PATENT DOCUMENTS

| 2005/0091968 | A1* | 5/2005 | van Nieuwstadt et al. ..... | 60/286 |
| 2008/0223019 | A1* | 9/2008 | Gonze et al. .................... | 60/286 |
| 2010/0192544 | A1* | 8/2010 | Tsujimoto ....................... | 60/277 |
| 2011/0113763 | A1* | 5/2011 | Hirota ............................. | 60/300 |

FOREIGN PATENT DOCUMENTS

WO   WO 2009008450 A1 *  1/2009
WO   WO 2009150988 A1 * 12/2009

* cited by examiner

*Primary Examiner* — Audrey K Bradley
*Assistant Examiner* — Jason Sheppard
(74) *Attorney, Agent, or Firm* — Cantor Colburn LLP

(57) ABSTRACT

An exhaust gas treatment system is provided, having an internal combustion engine, an exhaust gas conduit, an electrically heated catalyst ("EHC") device, an oxidization catalyst ("OC") device, an OC temperature sensor, a hydrocarbon ("HC") adsorber, and a control module. The hydrocarbon supply is selectively activated for delivery of a hydrocarbon and formation of an exhaust gas and hydrocarbon mixture therein. The EHC device is selectively activated to produce heat and induce oxidization. The OC device is in fluid communication with the exhaust gas conduit and located downstream of the EHC device. The OC temperature sensor is in fluid communication with the exhaust gas conduit and located downstream of the OC device. The HC adsorber is located downstream of the EHC device. The control module is in communication with the hydrocarbon supply, the EHC device, the OC device, the OC temperature sensor, and the HC adsorber.

15 Claims, 2 Drawing Sheets

ELECTRONICALLY HEATED HYDROCARBON (HC) ADSORBER

FIELD OF THE INVENTION

Exemplary embodiments of the invention relate to exhaust gas treatment systems for internal combustion engines and, more particularly, to an exhaust gas treatment system having an electrically heated catalyst ("EHC") that is selectively activated.

BACKGROUND

The exhaust gas emitted from an internal combustion engine, particularly a diesel engine, is a heterogeneous mixture that contains gaseous emissions such as carbon monoxide ("CO"), unburned hydrocarbons ("HC") and oxides of nitrogen ("$NO_x$") as well as condensed phase materials (liquids and solids) that constitute particulate matter ("PM"). Catalyst compositions typically disposed on catalyst supports or substrates are provided in an engine exhaust system to convert certain, or all of these exhaust constituents into non-regulated exhaust gas components.

One type of exhaust treatment technology for reducing CO and HC emissions is an oxidization catalyst ("OC") device. The OC includes a flow-through substrate and a catalyst compound applied to the substrate. The catalyst compound of the OC induces an oxidization reaction of the exhaust gases once the OC has attained a threshold or light-off temperature. One type of exhaust treatment technology for reducing $NO_x$ emissions is a selective catalyst reduction ("SCR") device that may be positioned downstream of the OC device. The SCR device includes a substrate, where a SCR catalyst compound is applied to the substrate. A reductant is typically sprayed into hot exhaust gases upstream of the SCR device. The reductant may be a urea solution that decomposes to ammonia ($NH_3$) in the hot exhaust gases and is absorbed by the SCR device. The ammonia then reduces the $NO_x$ to nitrogen in the presence of the SCR catalyst. However, the SCR device also needs to reach a threshold or light-off temperature to effectively reduce $NO_x$. During a cold start of the engine, the OC and the SCR have not attained the respective light-off temperatures, and therefore generally may not effectively remove CO, HC, and $NO_x$ from the exhaust gases.

One approach for increasing the effectiveness of the OC and the SCR devices involves having the engine operate at a higher temperature, which in turn also raises the temperature of the exhaust gases. However, this approach involves the engine operating at a lower level of efficiency to create the hotter exhaust gas, which results in greater fuel consumption. Accordingly, it is desirable to provide an efficient approach to increasing the temperature of the exhaust gases upstream of the OC and the SCR devices.

SUMMARY OF THE INVENTION

In one exemplary embodiment of the invention an exhaust gas treatment system is provided, having an internal combustion engine, an exhaust gas conduit, an electrically heated catalyst ("EHC") device, an oxidization catalyst ("OC") device, an OC temperature sensor, a hydrocarbon ("HC") adsorber, and a control module. The exhaust gas conduit is in fluid communication with, and is configured to receive an exhaust gas from the internal combustion engine. The hydrocarbon supply is connected to and is in fluid communication with the exhaust gas conduit. The hydrocarbon supply is selectively activated for delivery of a hydrocarbon and formation of an exhaust gas and hydrocarbon mixture therein. The EHC device is in fluid communication with the exhaust gas conduit and is configured to receive the exhaust gas and hydrocarbon mixture. The EHC device is selectively activated to produce heat and induce oxidization of the exhaust gas and hydrocarbon mixture. The OC device is in fluid communication with the exhaust gas conduit and located downstream of the EHC device. The OC device has an OC light-off temperature. The OC device is selectively activated to induce further oxidization of the exhaust gas and hydrocarbon mixture. The OC temperature sensor in fluid communication with the exhaust gas conduit and is located downstream of the OC device. The OC temperature sensor detects the temperature of the OC device. The HC adsorber is in fluid communication with the exhaust gas conduit and is located downstream of the EHC device. The HC adsorber adsorbs hydrocarbon from the exhaust gas when the OC device is not activated as stored energy. The HC adsorber is selectively heated by the EHC device and the OC device to induce oxidation of the stored hydrocarbon in an exothermic event. The control module is in communication with the hydrocarbon supply, the EHC device, the OC device, the OC temperature sensor, and the HC adsorber. The control module includes a control logic for monitoring the OC temperature sensor for the temperature of the OC device. The control module also includes a control logic for determining if the temperature of the OC device is below the OC light-off temperature. The control module includes a control logic for activating the EHC device if the temperature of the OC device is below the light off temperature. The control module includes a control logic for determining the amount of hydrocarbon adsorbed by the HC adsorber. The control module includes a control logic for determining if the amount of hydrocarbon adsorbed by the HC adsorber is below a HC threshold value. The control module includes a control logic for activating the hydrocarbon supply for delivery of hydrocarbon if the amount of hydrocarbon adsorbed by the HC adsorber is below the HC threshold value.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
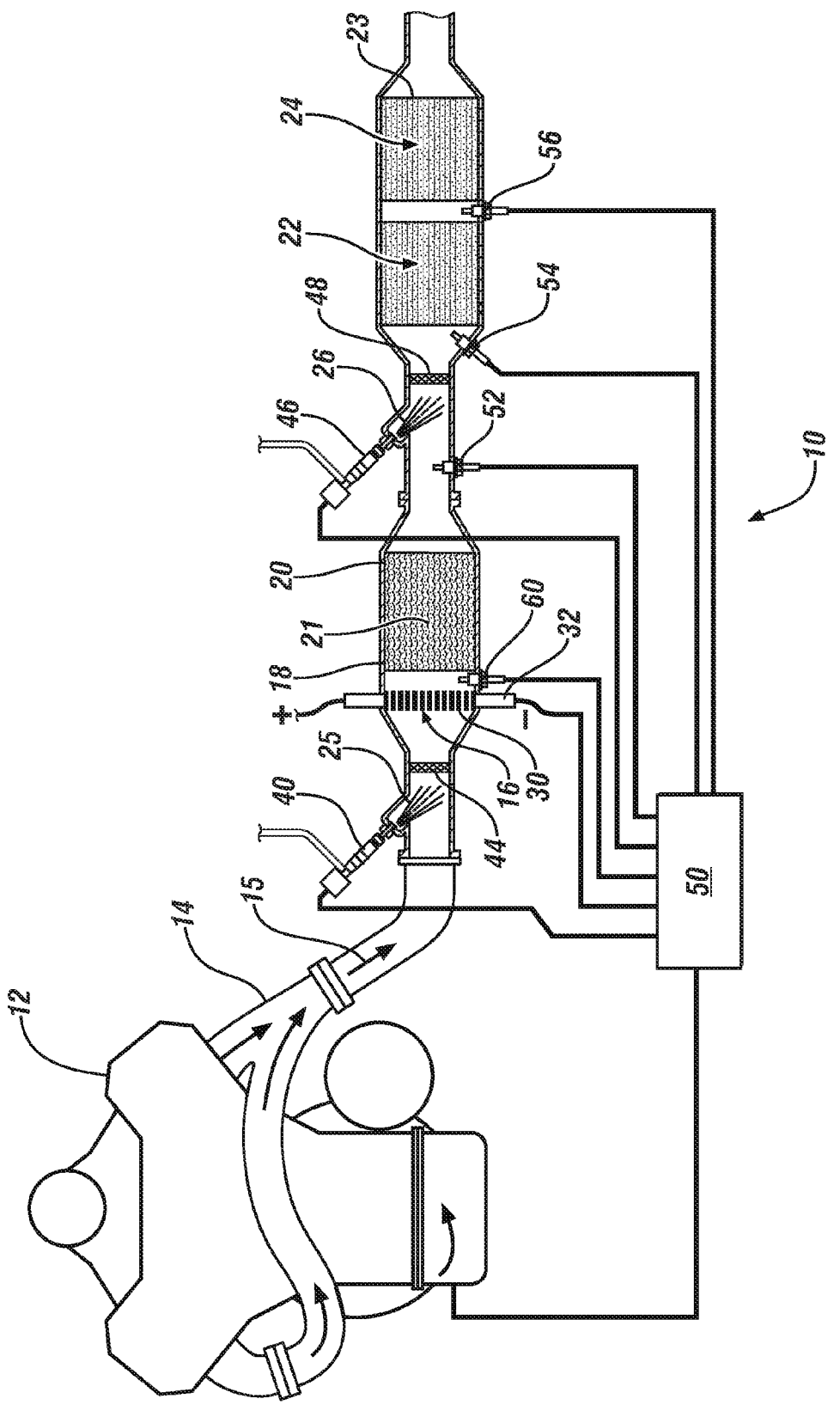
FIG. 1 is a schematic diagram of an exemplary exhaust gas treatment system.

The following description is merely exemplary in nature and is not intended to limit the present disclosure, its application or uses. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Referring now to FIG. 1, an exemplary embodiment is directed to an exhaust gas treatment system 10, for the reduction of regulated exhaust gas constituents of an internal combustion (IC) engine 12. The exhaust gas treatment system described herein can be implemented in various engine systems that may include, but are not limited to, diesel engine systems, gasoline direct injection systems, and homogeneous charge compression ignition engine systems.

The exhaust gas treatment system 10 generally includes one or more exhaust gas conduits 14, and one or more exhaust treatment devices. In the embodiment as illustrated, the exhaust gas treatment system devices include an electrically heated catalyst ("EHC") device 16, an oxidation catalyst device ("OC") 18, a hydrocarbon adsorber 20, a selective catalytic reduction device ("SCR") 22, and a particulate filter device ("PF") 24. As can be appreciated, the exhaust gas treatment system of the present disclosure may include various combinations of one or more of the exhaust treatment devices shown in FIG. 1, and/or other exhaust treatment devices (not shown), and is not limited to the present example.

In FIG. 1, the exhaust gas conduit 14, which may comprise several segments, transports exhaust gas 15 from the IC engine 12 to the various exhaust treatment devices of the exhaust gas treatment system 10. The EHC 16 is disposed upstream of the OC 18, the hydrocarbon adsorber 20, the SCR 22, and the PF 24. The EHC 16 includes a monolith 30 and an electrical heater 32, where the electrical heater 32 is selectively activated and heats the monolith 30. The electrical heater 32 is connected to an electrical source (not shown) that provides power thereto. In one embodiment, the electrical heater 32 operates at a voltage of about 12-24 volts and at a power range of about 1-3 kilowatts, however it is understood that other operating conditions may be used as well. The EHC 16 may be constructed of any suitable material that is electrically conductive such as the wound or stacked metal monolith 30. An oxidation catalyst compound (not shown) may be applied to the EHC 16 as a wash coat and may contain platinum group metals such as platinum (Pt), palladium (Pd), rhodium (Rh) or other suitable oxidizing catalysts, or combination thereof.

The OC 18 is located downstream of the EHC 16 and may include, for example, a flow-through metal or ceramic monolith substrate that may be packaged in a stainless steel shell or canister having an inlet and an outlet in fluid communication with exhaust gas conduit 14. The substrate can include an oxidation catalyst compound disposed thereon. The oxidation catalyst compound may be applied as a wash coat and may contain platinum group metals such as platinum (Pt), palladium (Pd), rhodium (Rh) or other suitable oxidizing catalysts, or combination thereof. The OC 18 is useful in treating unburned gaseous and non-volatile HC and CO, which are oxidized to form carbon dioxide and water.

The hydrocarbon adsorber 20 is located downstream of the EHC 16 and includes for example, a flow-through metal or ceramic monolith substrate. The substrate can include a hydrocarbon adsorber compound disposed thereon. The hydrocarbon adsorber compound may be applied as a wash coat and may contain materials such as, for example, zeolyte. The hydrocarbon adsorber 20 is configured for reducing the emissions of HC during an engine cold start condition when the OC 18 and the SCR 22 have not heated to the respective light-off temperatures and are not active by acting as a mechanism for storing fuel energy. Specifically, the hydrocarbon adsorber 20 is used to store fuel or hydrocarbons during a cold start. The EHC 16 provides heat to the hydrocarbon adsorber 20 in an exothermic reaction. The heat created by the ignited fuel will thereby generate a thermal exothem, which quickly heats the exhaust treatment devices that are located downstream of the hydrocarbon adsorber 20. In the exemplary embodiment as illustrated in FIG. 1, the OC 18 and the hydrocarbon adsorber 20 are combined together into a single, integrated component, and share a common catalyst substrate 21. In one embodiment, the substrate 21 includes a honeycomb structure, where the oxidization catalyst and the hydrocarbon adsorber are applied to the surface of the substrate 21 as a wash coat.

An HC or fuel injector 40 may be located upstream of the hydrocarbon adsorber 20 in fluid communication with the exhaust gas 15 in the exhaust gas conduit 14. The fuel injector 40 is in fluid communication with an HC supply (not shown), and is configured to introduce an unburned HC 25 into the exhaust gas stream for delivery to the hydrocarbon adsorber 20. A mixer or turbulator 44 may also be disposed within the exhaust conduit 14, in close proximity to the HC injector 40, to further assist in thorough mixing of the HC 25 with the exhaust gas 15 to create an exhaust gas and hydrocarbon mixture. The hydrocarbon adsorber 20 is used to selectively adsorb hydrocarbons from the exhaust gas and hydrocarbon mixture.

The SCR 22 may be disposed downstream of the OC 18. In a manner similar to the OC 18, the SCR 22 may include, for example, a flow-through ceramic or metal monolith substrate that may be packaged in a stainless steel shell or canister having an inlet and an outlet in fluid communication with the exhaust gas conduit 14. The substrate may include an SCR catalyst composition applied thereto. The SCR catalyst composition may contain a zeolite and one or more base metal components such as iron (Fe), cobalt (Co), copper (Cu) or vanadium ("V") which can operate efficiently to convert $NO_x$ constituents in the exhaust gas 15 in the presence of a reductant such as ammonia ($NH_3$).

An ammonia ($NH_3$) reductant 26 may be supplied from a reductant supply source (not shown) and may be injected into the exhaust gas conduit 14 at a location upstream of the SCR 22 using an injector 46, or other suitable method of delivery of the reductant to the exhaust gas 15. The reductant 26 may be in the form of a gas, a liquid, or an aqueous urea solution and may be mixed with air in the injector 46 to aid in the dispersion of the injected spray. A mixer or turbulator 48 may also be disposed within the exhaust conduit 14 in close proximity to the injector 46 to further assist in thorough mixing of the reductant 26 with the exhaust gas 15.

The PF 24 may be disposed downstream of the SCR 22. The PF 24 operates to filter the exhaust gas 15 of carbon and other particulates. In various embodiments, the PF 24 may be constructed using a ceramic wall flow monolith filter 23 that may be packaged in a shell or canister constructed of, for example, stainless steel, and that has an inlet and an outlet in fluid communication with exhaust gas conduit 14. The ceramic wall flow monolith filter 23 may have a plurality of longitudinally extending passages that are defined by longitudinally extending walls. The passages include a subset of inlet passages that have and open inlet end and a closed outlet end, and a subset of outlet passages that have a closed inlet end and an open outlet end. Exhaust gas 15 entering the filter 23 through the inlet ends of the inlet passages is forced to migrate through adjacent longitudinally extending walls to the outlet passages. It is through this wall flow mechanism that the exhaust gas 15 is filtered of carbon and other particulates. The filtered particulates are deposited on the longitudinally extending walls of the inlet passages and, over time, will have the effect of increasing the exhaust gas backpressure experienced by the IC engine 12. It is appreciated that the ceramic wall flow monolith filter is merely exemplary in nature and that the PF 22 may include other filter devices such as wound or packed fiber filters, open cell foams, sintered metal fibers, etc.

A control module 50 is operably connected to and monitors the engine 12 and the exhaust gas treatment system 10 through a number of sensors. Specifically, FIG. 1 illustrates the control module 50 in communication with three temperature sensors 52, 54 and 56 located in the exhaust gas conduit 14. The first temperature sensor 52 is situated downstream of the OC 18, the second temperature sensor 44 is situated downstream of both the first temperature sensor 52 and the OC device 18, and the third temperature sensor 56 is situated downstream of the SCR 22 and the first and second temperature sensors 52, 54. The temperature sensors 52, 54 and 56 send electrical signals to the control module 50 that each indicate the temperature in the exhaust gas conduit 14 in specific locations.

The control module 50 is also operably connected to the electrical heater 32 of the EHC 16, the fuel injector 40, and the reductant supply source (not shown). The control module 50 includes control logic for monitoring the first temperature sensor 52 and selectively activating the electrical heater 32 based on the temperature detected by the first temperature sensor 52. The first temperature sensor 52 detects the temperature of the OC 18 ("$T_{EHDOC}$"). The control module 50 includes control logic for determining if the temperature OC $T_{EHDOC}$ is below a threshold value, which is a light-off temperature or minimum operating temperature of the OC 18. The light-off temperature of the OC 18 represents the temperature where the OC 18 oxidizes unburned gaseous and non-volatile HC and CO and forms carbon dioxide and water. In one exemplary embodiment, the light-off temperature of the OC 18 is about 200° C. If the temperature of the OC 18 is below the light-off temperature of the OC 18, then the EHC 16 is activated. Specifically, the control module 50 includes control logic for activating the electrical heater 32.

The control module 50 also has control logic for determining the amount of hydrocarbons that have been adsorbed by the hydrocarbon adsorber 20. That is, the control module 50 includes control logic for monitoring the amount of hydrocarbon or fuel 25 that has been emitted into the exhaust gas stream 15 by the fuel injector 40 and adsorbed within the hydrocarbon adsorber 20. In another exemplary embodiment, it is contemplated that, in some circumstances the fuel injector 40 may be omitted, and the control module 50 may modify operating parameters of the engine 12 to control the hydrocarbon levels in the exhaust gas 15. Specifically, the control module 50 adjusts the engine timing and rate/frequency of fueling to deliver excess, unburned fuel into the exhaust gas conduit 14 for mixing with the exhaust gas 15. The memory of the control module 50 stores a threshold hydrocarbon value, which indicates the maximum amount of hydrocarbons that the hydrocarbon adsorber 20 is capable of adsorbing. The maximum amount of hydrocarbons is based on the amount of hydrocarbon adsorber compound disposed on the substrate of the hydrocarbon adsorber 20.

The control module 50 further includes control logic for determining if the amount of hydrocarbons adsorbed by the hydrocarbon adsorber 20 is less than the threshold hydrocarbon value of the hydrocarbon adsorber 20. If the control module 50 determines that the threshold hydrocarbon value has not been met, then the control module 50 further includes control logic for activating the fuel injector 40. Upon activation, the fuel injector 40 introduces the unburned HC 25 into the exhaust gas stream for delivery to the hydrocarbon adsorber 20. If the control module 50 determines that the threshold hydrocarbon value has been met, then the control module further includes control logic for deactivating the fuel injector 40. Alternatively, the fuel injector 40 may be omitted and the control module 50 may modify operating parameters of the engine 12 to control the hydrocarbon levels in the exhaust gas 15. The hydrocarbon adsorber 20 is used to store HCs injected by the fuel injector 40 during a cold start of the engine 12.

The control module 50 includes control logic for monitoring the temperature of the EHC 16. The control module 50 may monitor the temperature of the EHC 16 by several different approaches. In one approach, a temperature sensor 60 is placed downstream of the EHC and is in communication with the control module 50 for detecting the temperature of the EHC 16. In an alternative approach, the temperature sensor 60 is omitted, and instead the control module 50 includes control logic for determining the temperature of the EHC 16 based on operating parameters of the exhaust gas system 10. Specifically, the temperature of the EHC 16 may be calculated based on the exhaust flow of the engine 12, an input gas temperature of the engine 12, and the electrical power provided to the electrical heater 32. The exhaust flow of the engine 12 is calculated by adding the intake air mass of the engine 12 and the fuel mass of the engine 12, where the intake air mass is measured using an intake air mass flow sensor (not shown) of the engine 12, which measures air mass flow entering the engine 12. The fuel mass flow is measured by summing the total amount of fuel injected into the engine 12 over a given period of time. The fuel mass flow is added to the air mass flow rate to calculate the exhaust flow of the engine 12.

The control module 50 includes control logic for determining if the temperature of the EHC 16 is above a threshold or EHC light-off temperature. The EHC light-off temperature is the temperature at which rapid HC oxidation occurs within the oxidation catalyst compound (not shown) of the EHC 16. In one exemplary embodiment, the EHC light-off temperature is about 250° C. If the temperature of the EHC 16 is above the EHC light-off temperature, then the control module 50 includes control logic for introducing hydrocarbons 25 into the exhaust gas 15. Specifically, the hydrocarbons 25 are introduced into the exhaust gas 15 and are trapped by the adsorber 20 until the OC 18 is heated to an OC threshold or light-off temperature. The OC light-off temperature is the temperature at which unburned gaseous and non-volatile HC and CO are oxidized in the OC 18 and form carbon dioxide and water.

The amount of hydrocarbons introduced into the exhaust gas 15 is based on the temperature $T_{EHDOC}$ of the OC 18 as well as the maximum amount of hydrocarbons that may be trapped by the adsorber 20 prior to the OC 18 light-off. Specifically, the memory of the control module 50 stores a value ("OC Volume") that indicates the maximum amount of hydrocarbons that can be stored within the adsorber compound of the substrate of the adsorber 20. The OC Volume depends on the amount of hydrocarbon adsorber that is applied to the substrate of the adsorber 20. In one embodiment, the control module 50 may include control logic for activating the fuel injector 40 to introduce the hydrocarbons 25 into the exhaust gas stream 15. Alternatively, the control module 50 may modify operating parameters of the engine 12 to control the hydrocarbon levels in the exhaust gas 15.

The control module 50 further includes control logic for determining the temperature profile of the SCR 22 based on the second and third temperature sensors 54, 56. The temperature profile of the SCR 22 represents the overall temperature of the SCR device 22, and is based on the second temperature T2 detected by the second temperature sensor 54, and the third temperature T3 detected by the second temperature sensor 56. The control module 50 includes control logic for averaging the second temperature T2 and the third temperature T3 together, where the average of the second temperature T2 and the third temperature T3 is the temperature profile of the SCR 22 ("$T_{avg\ SCR}$"). It should be noted that while FIG. 1 illustrates two temperature sensors 54, 56, in an alternative embodiment the temperature sensors 54, 56 may be omitted. Instead, the control module 50 may include control logic for calculating temperature profile $T_{avg\ SCR}$ of the SCR 22 based on the operating conditions of the exhaust gas system 10 and the engine 12, as well as the mass of the SCR device 22. Specifically, the temperature profile $T_{avg\ SCR}$ of the SCR 22 could be calculated based on the exhaust gas inlet temperature that is measured by a temperature sensor (not shown) located in the exhaust gas conduit 14 upstream of the OC 18, the mass flow rate or exhaust flow of the engine 12, and the mass of the SCR unit 22. The exhaust flow of the engine 12 is calculated by adding the intake air mass of the engine 12 and the fuel mass of the engine 12. The intake air mass is measured using an intake air mass flow sensor (not shown) of the engine 12, which measures air mass flow entering the engine 12. The fuel mass flow is measured by summing the total amount of fuel injected into the engine 12 over a given period of time. The fuel mass flow is added to the air mass flow rate to calculate the exhaust flow of the engine 12.

The control module 50 includes control logic for selectively deactivating the EHC 16 based on the temperature profile $T_{avg\ SCR}$ of the SCR 22. Specifically, if the temperature profile $T_{avg\ SCR}$ of the SCR 22 is above a light-off or minimum operating temperature, then the electrical heater 32 is deactivated, and no longer heats the EHC 16. However, as long as the temperature profile $T_{avg\ SCR}$ of the SCR 22 is below the light-off temperature the electrical heater 32 remains activated, and heat is provided to the SCR 22. The SCR 22 is heated to the light-off temperature and converts the reductant 26 into ammonia and generally effectively reduces the amount of $NO_x$ in the exhaust gas 15. Thus, the exhaust gas treatment system 10 includes the EHC 16 for providing heat to the OC 18, which in turn heats the OC device 18 to the respective light-off temperatures more quickly when compared to an exhaust gas treatment that does not include an EHC.

Moreover, the exhaust gas treatment system 10 also includes the EHC 16 and the hydrocarbon adsorber 20 for decreasing the time needed for the SCR 22 to reach the respective light-off temperature. Specifically, the hydrocarbon adsorber 20 stores HCs 25 injected into the exhaust gas 15 until the HCs are ignited by heat provided by the EHC 16 and the OC 18. The heat created by the ignited fuel will thereby generate heat that is directed downstream of the hydrocarbon adsorber 20 to the SCR 22. Therefore, providing an EHC 16 and a hydrocarbon adsorber 20 will allow for the exhaust gas treatment system 10 to insert HCs 25 into the exhaust gas 15 prior to the SCR 22 reaching light-off. The HCs stored in the hydrocarbon adsorber 20 act as stored energy, where the stored energy is released in an exothermic reaction when the HCs are ignited by the heat created by EHC 16. This exotherm provides heat to the SCR 22, which in turn allows for the SCR 22 to be heated to its respective light-off temperature more quickly when compared to an exhaust gas treatment system that does not include an EHC and hydrocarbon adsorber.

Figure 2:
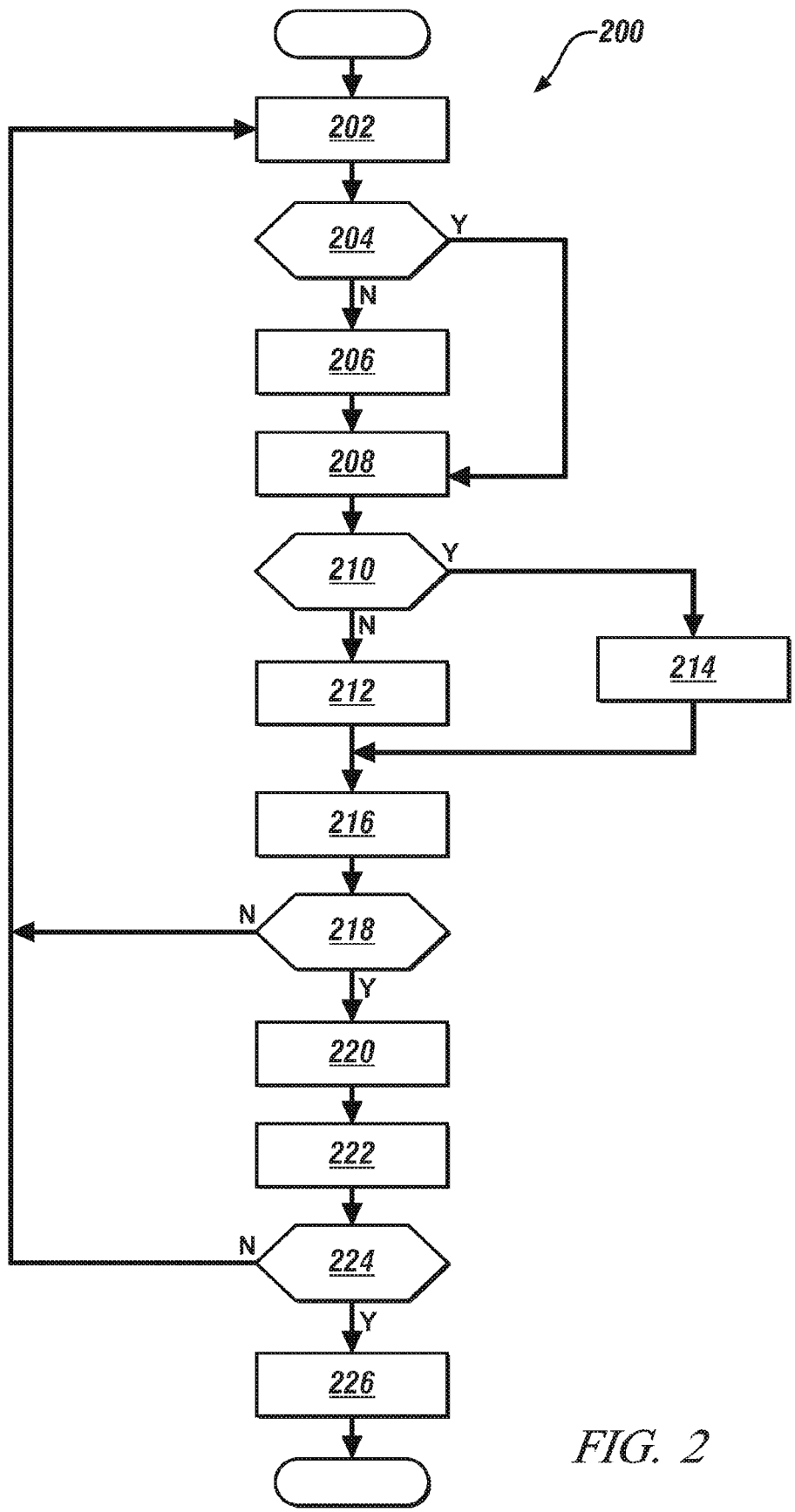
FIG. 2 is a process flow diagram illustrating a method of activating an electrically heated catalyst ("EHC") illustrated in FIG. 1.

A method of operating the exhaust gas treatment system 10 will now be explained. Referring to FIG. 2, an exemplary process flow diagram illustrating an exemplary process of operating the exhaust gas treatment system 10 is generally indicated by reference number 200. Process 200 begins at step 202, where a control module 50 includes control logic for monitoring the temperature profile of an OC device 18. Specifically, referring back to FIG. 1, the control module 50 is operably connected to and monitors an engine 12 and the exhaust gas treatment system 10 through a number of sensors. The control module 50 in communication with three temperature sensors 52, 54 and 56 located in the exhaust gas conduit 14, where a first temperature sensor 52 is situated downstream of the OC 18. The first temperature sensor 52 detects the temperature $T_{EHDOC}$ of the OC 18. Method 200 may then proceed to step 204.

In step 204, the control module 50 includes control logic for determining if the temperature $T_{EHDOC}$ of the OC 18 is below a light-off temperature or minimum operating temperature of the OC 18. If the temperature of the OC 18 is above the light off temperature, which is denoted by a "Y", then method 200 advances to step 208, which is discussed below. However, if the temperature of the OC 18 is below the light-off temperature of the OC 18, which is denoted by an "N", then method 200 may then proceed to step 206.

In step 206, the control module 50 includes control logic for activating an EHC 16. Specifically, the control module 50 includes control logic for activating an electrical heater 32 of the EHC 16. Method 200 may then proceed to step 208.

In step 208, the control module 50 includes control logic for determining the amount of hydrocarbons that have been adsorbed by a hydrocarbon adsorber 20. In one embodiment, the control module 50 includes control logic for monitoring the amount of hydrocarbon or fuel 25 that has been emitted into the exhaust gas stream 15 by the fuel injector 40 and adsorbed within the hydrocarbon adsorber 20. In another exemplary embodiment, it is contemplated that, in some circumstances the fuel injector 40 may be omitted, and the control module 50 may modify operating parameters of the engine 12 to control the hydrocarbon levels in the exhaust gas 15. Method 200 may then proceed to step 210.

In step 210, the control module 50 includes control logic for determining if the amount of hydrocarbons adsorbed by the hydrocarbon adsorber 20 is less than a threshold hydrocarbon value of the hydrocarbon adsorber 20. If the control module 50 determines that the threshold hydrocarbon value has not been met, which is denoted by an "N", then method 200 proceeds to step 212. In step 212, the control module 50 includes control logic for activating the fuel injector 40. Upon activation, the fuel injector 40 introduces unburned HC 25 into the exhaust gas stream for delivery to the hydrocarbon adsorber 20. Alternatively, the fuel injector 40 may be omitted and the control module 50 may modify operating parameters of the engine 12 to control the hydrocarbon levels in the exhaust gas 15. If the control module 50 determines that the threshold hydrocarbon value has been met, which is denoted by a "Y", then method 200 proceeds to step 214. In step 214, the control module includes control logic for deactivating the fuel injector 40. Both of steps 212 and 214 then proceed to step 216.

In step 216, the control module 50 includes control logic for monitoring the temperature of the EHC 16. The control module 50 may monitor the temperature of the EHC 16 by several different approaches. In one approach, a temperature sensor 60 is placed downstream of the EHC 16 and is in communication with the control module 50 for detecting the temperature of the EHC 16. In an alternative approach, the temperature sensor 60 is omitted, and instead the control module 50 includes control logic for determining the temperature of the EHC 16 based on operating parameters of the exhaust gas system 10. Method 200 may then proceed to step 218.

In step 218, the control module 50 includes control logic for determining if the temperature of the EHC 16 is above a threshold or EHC light-off temperature. In one exemplary embodiment, the EHC light-off temperature is about 250° C. If the temperature of the EHC 16 is below the light-off temperature, which is denoted by a "N", then method 200 returns to step 202. If the temperature of the EHC 16 is above the light-off temperature, which is denoted by a "Y", then method 200 proceed to step 220.

In step 220, the control module 50 includes control logic for introducing hydrocarbons 25 into the exhaust gas 15. Specifically, the hydrocarbons 25 are introduced into the exhaust gas 15 and are trapped by the hydrocarbon adsorber 20 until the OC 18 is heated to an OC threshold or light-off temperature. The OC light-off temperature is the temperature at which unburned gaseous and non-volatile HC and CO are oxidized in the OC 18 and form carbon dioxide and water. The amount of hydrocarbons introduced into the exhaust gas 15 is based on the temperature $T_{EHDOC}$ of the OC 18 as well as the maximum amount of hydrocarbons that may be trapped by the adsorber 20 prior to the OC 18 light-off. Method 200 may then proceed to step 222.

In step 222, the control module 50 includes control logic for determining the temperature profile of the SCR 22. In one embodiment, the temperature profile is based on the second and third temperature sensors 54, 56, where the control module 50 includes control logic for averaging the second temperature T2 and the third temperature T3 together. The average of the second temperature T2 and the third temperature T3 is the temperature profile $T_{avg\ SCR}$ of the SCR 22. However, in an alternative embodiment the temperature sensors 54, 56 may be omitted. Instead, the control module 50 includes control logic for calculating the temperature profile $T_{avg\ SCR}$ of the SCR 22 based on the operating conditions of the exhaust gas system 10 and the engine 12, as well as the mass of the SCR device 22. Method 200 may then proceed to step 224.

In step 224, the control module 50 includes control logic for determining if the temperature profile $T_{avg\ SCR}$ of the SCR 22 is above a light-off or minimum operating temperature. If the temperature profile $T_{avg\ SCR}$ of the SCR 22 is not above the light-off temperature, which is denoted by an "N", then method 200 returns to step 202. If the temperature profile $T_{avg\ SCR}$ is above the light-off temperature of the SCR device 22, which is denoted by a "Y", then method 200 proceeds to step 226.

In step 226, the control module 50 includes control logic for deactivating the EHC 16 based on the temperature profile $T_{avg\ SCR}$ of the SCR 22. Specifically, if the temperature profile $T_{avg\ SCR}$ of the SCR 22 is above the light-off temperature, then the electrical heater 32 is deactivated, and no longer heats the EHC 16. Method 200 may then terminate.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. An exhaust gas treatment system for an internal combustion engine, comprising:
   an exhaust gas conduit in fluid communication with, and configured to receive an exhaust gas from the internal combustion engine;
   a hydrocarbon supply connected to and in fluid communication with the exhaust gas conduit, wherein the hydrocarbon supply is selectively activated for delivery of a hydrocarbon and formation of an exhaust gas and hydrocarbon mixture therein;
   an electrically heated catalyst ("EHC") device in fluid communication with the exhaust gas conduit and configured to receive the exhaust gas and hydrocarbon mixture, and wherein the EHC device is selectively activated to produce heat and induce oxidization of the exhaust gas and hydrocarbon mixture;
   an EHC temperature sensor in fluid communication with the exhaust gas conduit and located downstream of the EHC device for detecting the temperature of the EHC device;
   an oxidization catalyst ("OC") device in fluid communication with the exhaust gas conduit and located downstream of the EHC device, wherein the OC device has an OC light-off temperature, and wherein the OC device is selectively activated to induce further oxidization of the exhaust gas and hydrocarbon mixture;
   an OC temperature sensor in fluid communication with the exhaust gas conduit and located downstream of the OC device, wherein the OC temperature sensor detects the temperature of the OC device;
   a hydrocarbon ("HC") adsorber in fluid communication with the exhaust gas conduit and located downstream of the EHC device, wherein the HC adsorber adsorbs the hydrocarbons from the exhaust gas and hydrocarbon mixture as stored energy when the OC device is not activated, and wherein the HC adsorber is selectively heated by the EHC device and the OC device to induce oxidization of the stored hydrocarbon in an exothermic event;
   a control module in communication with the hydrocarbon supply, the EHC device, the EHC temperature sensor, the OC device, the OC temperature sensor, and the HC adsorber, comprising:
      a processor coupled to a memory;
      a control logic for monitoring the OC temperature sensor for the temperature of the OC device;
      a control logic for determining if the temperature of the OC device is below the OC light-off temperature;
      a control logic for activating the EHC device if the temperature of the OC device is below the light-off temperature;
      a control logic for determining the amount of hydrocarbon mixture adsorbed by the HC adsorber;
      a control logic for determining if the amount of hydrocarbon adsorbed by the HC adsorber is below a HC threshold value; and
      a control logic for activating the hydrocarbon supply for delivery of hydrocarbon if the amount of hydrocarbon adsorbed by the HC adsorber is below the HC threshold value;
      a control logic for monitoring a temperature of the EHC device;
      a control logic for determining if the temperature of the EHC device is above the EHC light-off temperature;

a control logic for keeping the EHC device activated until the temperature of the EHC device reaches above the EHC light-off temperature; and a control logic for keeping the hydrocarbon supply activated for delivery of hydrocarbon to the HC adsorber until the temperature of the EHC device reaches above the EHC light-off temperature so that the HC adsorber traps the delivered hydrocarbon until the delivered hydrocarbon is ignited.

2. The exhaust treatment system of claim 1, wherein the control module includes a control logic for deactivating the hydrocarbon supply if the amount of hydrocarbon adsorbed by the HC adsorber is above the HC threshold value.

3. The exhaust treatment system of claim 1, further comprising:
  a selective catalyst reduction (SCR) device located downstream of the OC device;
  a second temperature sensor located downstream of both the OC temperature sensor and the OC device, and
  a third temperature sensor located downstream of the SCR device, the OC temperature sensor, and the second temperature sensor.

4. The exhaust treatment system of claim 3, wherein the control module includes a control logic for monitoring the second temperature sensor and the third temperature sensor.

5. The exhaust treatment system of claim 4, wherein the control module includes a control logic for calculating an SCR temperature profile based on the second temperature sensor and the third temperature sensor, wherein the temperatures of the second temperature sensor and the third temperature sensor are averaged together to create the SCR temperature profile.

6. The exhaust treatment system of claim 1, further comprising a selective catalyst reduction (SCR) device located downstream of the OC device, wherein the control module includes a control logic for calculating an SCR temperature profile based on the operating conditions of the exhaust gas system, the internal combustion engine, and the mass of the SCR device.

7. The exhaust treatment system of claim 6, wherein the control module includes a control logic for determining if the temperature profile of the SCR is above a SCR light-off temperature of the SCR device.

8. The exhaust treatment system of claim 7, wherein the control module includes a control logic for deactivating the EHC if the temperature profile of the SCR device is above the SCR light-off temperature of the SCR device.

9. An exhaust gas treatment system for an internal combustion engine, comprising:
  an exhaust gas conduit in fluid communication with, and configured to receive an exhaust gas from the internal combustion engine;
  a hydrocarbon supply connected to and in fluid communication with the exhaust gas conduit, wherein the hydrocarbon supply is selectively activated for delivery of a hydrocarbon and formation of an exhaust gas and hydrocarbon mixture therein;
  an electrically heated catalyst ("EHC") device in fluid communication with the exhaust gas conduit and configured to receive the exhaust gas and hydrocarbon mixture, and wherein the EHC device is selectively activated to produce heat and induce oxidization of the exhaust gas and hydrocarbon mixture;
  an EHC temperature sensor in fluid communication with the exhaust gas conduit and located downstream of the EHC device for detecting the temperature of the EHC device;
  an oxidization catalyst ("OC") device in fluid communication with the exhaust gas conduit and located downstream of the EHC device, wherein the OC device has an OC light-off temperature, and wherein the OC device is selectively activated to induce further oxidization of the exhaust gas and hydrocarbon mixture;
  an OC temperature sensor in fluid communication with the exhaust gas conduit and located downstream of the OC device, wherein the OC temperature sensor detects the temperature of the OC device;
  a hydrocarbon ("HC") adsorber in fluid communication with the exhaust gas conduit and located downstream of the EHC device, wherein the HC adsorber adsorbs the hydrocarbon from the exhaust gas when the OC device is not activated as stored energy, and wherein the HC adsorber is selectively heated by the EHC device and the OC device to release the hydrocarbon in an exothermic event; and
  a control module in communication with the hydrocarbon supply, the EHC device, the EHC temperature sensor, the OC device, the OC temperature sensor, and the HC adsorber, comprising:
    a processor coupled to a memory;
    a control logic for monitoring the OC temperature sensor for the temperature of the OC device;
    a control logic for determining if the temperature of the OC device is below the OC light-off temperature;
    a control logic for activating the EHC device if the temperature of the OC device is below the light-off temperature;
    a control logic for determining the amount of exhaust gas and hydrocarbon mixture adsorbed by the HC adsorber;
    a control logic for determining if the amount of hydrocarbon adsorbed by the HC adsorber is below a HC threshold value;
    a control logic for activating the hydrocarbon supply for delivery of hydrocarbon if the amount of hydrocarbon adsorbed by the HC adsorber is below the HC threshold value;
    a control logic for monitoring a temperature of the EHC device;
    a control logic for determining if the temperature of the EHC device is above an EHC light-off temperature;
    a control logic for keeping the EHC device activated until the temperature of the EHC device reaches above the EHC light-off temperature;
    a control logic for keeping the hydrocarbon supply activated for delivery of hydrocarbon to the HC adsorber until the temperature of the EHC device reaches above the EHC light-off temperature so that the HC adsorber traps the delivered hydrocarbon until the delivered hydrocarbon is ignited; and
    a control logic for activating the hydrocarbon supply for delivery of the hydrocarbon if the temperature of the EHC device is above the EHC light-off temperature.

10. The exhaust treatment system of claim 9, wherein the control module includes a control logic deactivating the hydrocarbon supply if the amount of hydrocarbon adsorbed by the HC adsorber is above the HC threshold value.

11. The exhaust treatment system of claim 9, wherein the amount of hydrocarbon that is delivered by the hydrocarbon supply, if the temperature of the EHC is above the EHC light-off temperature, is based on the temperature of the OC device and a maximum amount of hydrocarbon that is trappable by the OC device prior to OC light-off.

12. The exhaust treatment system of claim 11, further comprising a selective catalyst reduction (SCR) device located downstream of the OC device, wherein the control module includes a control logic for calculating an SCR temperature profile based on the operating conditions of the exhaust gas system, the internal combustion engine, and the mass of the SCR device.

13. The exhaust treatment system of claim 12, wherein the control module includes a control logic for determining if the temperature profile of the SCR is above a SCR light-off temperature of the SCR device.

14. The exhaust treatment system of claim 13, wherein the control module includes a control logic for deactivating the EHC if the temperature profile of the SCR device is above the SCR light-off temperature of the SCR device.

15. An exhaust gas treatment system, comprising:
an internal combustion engine;
an exhaust gas conduit in fluid communication with, and configured to receive an exhaust gas from the internal combustion engine;
a hydrocarbon supply connected to and in fluid communication with the exhaust gas conduit, wherein the hydrocarbon supply is selectively activated for delivery of a hydrocarbon and formation of an exhaust gas and hydrocarbon mixture therein;
an electrically heated catalyst ("EHC") device in fluid communication with the exhaust gas conduit and configured to receive the exhaust gas and hydrocarbon mixture, and wherein the EHC device is selectively activated to produce heat and induce oxidization thereof;
an EHC temperature sensor in fluid communication with the exhaust gas conduit and located downstream of the EHC device for detecting the temperature of the EHC device;
an oxidization catalyst ("OC") device in fluid communication with the exhaust gas conduit and located downstream of the EHC device, wherein the OC device has an OC light-off temperature, and wherein the OC device is selectively activated to induce further oxidization of the exhaust gas and hydrocarbon mixture;
an OC temperature sensor in fluid communication with the exhaust gas conduit and located downstream of the OC device, wherein the OC temperature sensor detects the temperature of the OC device;
a hydrocarbon ("HC") adsorber in fluid communication with the exhaust gas conduit and located downstream of the EHC device, wherein the HC adsorber adsorbs the hydrocarbon from the exhaust gas and hydrocarbon mixture when the OC device is not activated as stored energy, and wherein the HC adsorber is selectively heated by the EHC device to release the hydrocarbon and induce an exothermic oxidization thereof;
a selective catalyst reduction (SCR) device in fluid communication with the exhaust gas conduit and configured to receive the exhaust gas;
a second temperature sensor and a third temperature sensor, wherein the second temperature is located downstream of both the OC temperature sensor and the OC device, and the third temperature sensor is situated downstream of the SCR device, the OC temperature sensor, and second temperature sensor; and
a control module in communication with the hydrocarbon supply, the EHC device, the EHC temperature sensor, the OC device, the OC temperature sensor, the SCR device, the second temperature sensor, the third temperature sensor, and the HC adsorber, comprising:
a processor coupled to a memory;
a control logic for monitoring the OC temperature sensor for the temperature of the OC device;
a control logic for determining if the temperature of the OC device is below the OC light-off temperature;
a control logic for activating the EHC device if the temperature of the OC device is below the light-off temperature;
a control logic for determining the amount of hydrocarbon adsorbed by the HC adsorber;
a control logic for determining if the amount of hydrocarbon adsorbed by the HC adsorber is below a HC threshold value;
a control logic for activating the hydrocarbon supply for delivery of hydrocarbon if the amount of hydrocarbon adsorbed in the HC adsorber is below the HC threshold value;
a control logic for monitoring a temperature of the EHC device;
a control logic for determining if the temperature of the EHC device is above an EHC light-off temperature;
a control logic for keeping the EHC device activated until the temperature of the EHC device reaches above the EHC light-off temperature;
a control logic for keeping the hydrocarbon supply activated for delivery of hydrocarbon to the HC adsorber until the temperature of the EHC device reaches above the EHC light-off temperature so that the HC adsorber traps the delivered hydrocarbon until the delivered hydrocarbon is ignited;
a control logic for activating the hydrocarbon supply for delivery of the hydrocarbon if the temperature of the EHC device is above the EHC light-off temperature;
a control logic for monitoring the second temperature sensor and the third temperature sensor;
a control logic for calculating an SCR temperature profile based on the second temperature sensor and the third temperature sensor, wherein the temperatures of the second temperature sensor and the third temperature sensor are averaged together to create the SCR temperature profile;
a control logic for determining if the temperature profile of the SCR is above an SCR light-off temperature of the SCR device; and
a control logic for deactivating the EHC if the temperature profile of the SCR device is above the SCR light-off temperature of the SCR device.

* * * * *